US007603396B2

(12) United States Patent
Durbin

(10) Patent No.: US 7,603,396 B2
(45) Date of Patent: Oct. 13, 2009

(54) TIME-SPAN REPRESENTATION AND TIME CHAIN OF EVENTS IN A RELATIONAL DATABASE

(75) Inventor: Gary Durbin, Oakland, CA (US)

(73) Assignee: SynchSource, Inc., Berkeley, CA (US)

( * ) Notice: Subject to any disclaimer, the term of this patent is extended or adjusted under 35 U.S.C. 154(b) by 162 days.

(21) Appl. No.: 11/507,937

(22) Filed: Aug. 21, 2006

(65) Prior Publication Data

US 2007/0050400 A1    Mar. 1, 2007

Related U.S. Application Data

(60) Provisional application No. 60/709,933, filed on Aug. 19, 2005.

(51) Int. Cl.
*G06F 17/30* (2006.01)
*G06F 12/00* (2006.01)
(52) U.S. Cl. .............................. 707/204; 707/3; 707/6; 707/102; 707/200; 707/203
(58) Field of Classification Search ...................... None
See application file for complete search history.

(56) References Cited

U.S. PATENT DOCUMENTS 5,548,755 A * 8/1996 Leung et al. .................. 707/2
5,950,210 A * 9/1999 Nelson ......................... 707/203

6,421,667 B1 * 7/2002 Codd et al. ................... 707/4

OTHER PUBLICATIONS

International Search Report and Written Opinion mailed Mar. 25, 2008, for PCT Application No. PCT/US06/32658 filed Aug. 21, 2006, 8 pages.

* cited by examiner

*Primary Examiner*—Greta L Robinson
*Assistant Examiner*—James J Wilcox
(74) *Attorney, Agent, or Firm*—Morrison & Foerster LLP

(57) ABSTRACT

A method to produce a history of at least a portion of a database comprising: providing a data store that includes a record indicating a first event associated with first data that describes a subject matter, and indicating a first time interval during which the first data is effective with respect to the subject matter and indicating a second time interval during which the first data is current with respect to the database; and adjusting the data store upon an occurrence of a new event to, update a first record indicating the first event associated with first data and indicating an end time of the first time interval, and add a second new record indicating a second event associated with second data that describes the subject matter, and indicating a start of a new first time interval that is substantially continuous with an end time of the first time interval and during which the second data is effective with respect to the subject matter and indicating a start of a new second time interval during which the second data is current with respect to the database.

72 Claims, 6 Drawing Sheets

TIME-SPAN REPRESENTATION AND TIME CHAIN OF EVENTS IN A RELATIONAL DATABASE

CROSS-REFERENCE TO RELATED APPLICATION

This patent application claims priority to commonly owned U.S. Provisional Patent Application Ser. No. 60/709,933, entitled TIME-SPAN REPRESENTATION AND THE TIME-CHAIN SOLUTION, filed Aug. 19, 2005, which is expressly incorporated in its entirety herein by this reference.

BACKGROUND OF THE INVENTION

1. Field of the Invention

The invention relates generally to computer-based storage of events and more particularly, to the optimized representation of events and their application to relational databases.

2. Description of the Related Art

For many years, the database model at the heart of many computer applications has been the Time Relational Data Model. This model uses date-times stored in database records—mainly relational databases—to create histories that record the changing events in the world in which people live—event date-times. The model also uses date-times stored in database record to record the date-times when computer processes take place—timestamps.

Database tables keep track of real-world events such as when someone is hired, when they get promoted, when they get married, when they have children, and when they retire. Because processes like counting the number of employees a company has, or reporting the people covered under employee insurance plans, or paying employees are based on the state of the data for a reporting period or for a particular point in time, the Time Relational Data Model is relied upon to provide time-based data. In some implementations of the TRDM, a single event date-time is stored in each record. That date-time value, the Effective Date, records the date-time that a real-world event took place. Other implementations simplify queries by adding an End Date.

Often a record is placed in the database after the real-world event has taken place. For example, an employee is hired and starts work at 9 o'clock on a Monday morning. The first thing she does is fill out some forms and turn them into the personnel department. Perhaps a day or two goes by before someone in the personnel department enters that data into the database. The event being recorded, the hire, occurred on Monday and is recorded in the database with an Effective Date of that event date-time. If this employee worked for the company for a year and then left, a second record would be written into the database recording the second event, the termination.

The records in a database are usually organized into tables where each table has the same fields and pertains to the same subject matter. When database tables record events and are stored with event date-times they are referred to as a history. Histories record the events related to a particular subject such as a person, an organization, a position, an object such as an automobile. The history for each individual subject is independent of the histories for others. Each record of a history contains the state of the history between the event date-time of that record and the record with the next highest date. If no records occur after a particular record, then the state recorded by that record applies into the indefinite future. For example, a hire record might record the employment state as "Active." A termination record might record the employment state as "Inactive." The state of the employment is "Active" for any date between the hire record and the termination and "Inactive" on the termination date and for any date thereafter.

In some histories, more than one event can take place at the same time, e.g. an employee is promoted and given a salary increase on the same day. When more than one event can occur, the database model usually includes a sequence field or other mechanism so that the two events can be distinguished and an order of occurrence determined. The last record with the same date-time contains the state of the history for the period between that record and the record with the next highest date-time.

Because retrieving the specific record that applies to a point in time results in a complex query, particularly when there are more than one record for the same date-time, many database models contain two fields. One date-time, the "Effective Date" records the date-time of the real world event and the second, the "End Date" is set to either the date-time immediately prior to the following record or a date-time far in the future. Such a data model greatly simplifies the retrieval of the specific record that applies on a date-time. This model can be referred to as the Effective Time Span model.

In the Effective Time Span model, the End Date for a record having no subsequent records is initially set to the indefinite future. If an event occurs subsequent to the Effective Date of the record, the End Date is updated to a date-time one instant lower than the Effective Date of the new record. In this way, there two records generally do not apply to the same time span.

When records are written into a database much later than when the real world event occurred, computer processes often have to account for the lateness of the entry. If an employee's salary change was written into a database after the payroll for the date of the salary change, then the amount the employee was underpaid must be computed when the payroll is run after the record is present in the database. This process is referred to as "retroactive" processing. In order to facilitate retroactive processing, many databases contain a field that records the date-time the record was written to the database. This field is sometimes referred to as the Create Timestamp. With such a field, it is possible to calculate the retroactive period—the gap between the real world event and the time the record was written to the database—and, it is possible for computer processes to detect retroactive records. A payroll process might record each time it runs, and then it would be able to detect records that were entered into the database between processes and determine if they applied to prior periods.

Data entered into databases is sometimes entered incorrectly. When records in histories are corrected, either the incorrect record is rewritten with the correct data or a new history is created and the incorrect record is marked as invalid. If the incorrect record is updated, the record of the inaccuracy can be lost. One purpose of leaving the invalid records in the database is to facilitate processes such as the retroactive process described above. If a previously computed payroll was incorrect, both the incorrect record and the correct record would be called for to compute the effect on the paycheck. A common way to indicate the correction of a record is to have a field, a Record Status, that indicates whether the record is valid or not. The field, Record Status, might contain a value "A" indicating that the record is Active and a value "C" indicating that the record is Corrected. In this way, computer processes can retrieve only Active records, Corrected records or both.

Retroactive processing often is facilitated by the addition of a fourth date, an Update Timestamp. This field records the date-time when a record was updated. Initially this field contains the same value as the Create Timestamp, but it is changed whenever the record's End Date changes or it is replaced by a corrected record and its Record Status is changed to Corrected. With an Update Timestamp, it is possible to determine the period that the database was incorrect.

If a record is found to be incorrect and there is no replacement—ordinarily it should be deleted—then in order to support retroactive processing, the record is marked as Corrected and its Update Timestamp can be set to the time of the update. This operation is referred to as a "Logical" deletion.

Four fields, Effective Date, Create Timestamp, Update Timestamp, and Record Status generally are sufficient to enable computer processes to select the records active at any point in time, or over any period and to determine whether the state of a history was incorrect and the period for which it was incorrect. Some queries are more efficient if an End Date is used but this is not essential. Several variations of these five fields with various names are widely used in the art.

With either the four-field or five-field scheme, it is feasible to perform "As of" queries on a database. Such queries might select all the Active records that apply to a point in time or apply to some period. It is also feasible to perform queries that select corrected records that applied to an effective date at an earlier database time. However, it is difficult to perform queries that select all the records that apply to a point in time as of an earlier database time—referred to as a Database Regression. For example, a report is prepared on Jan. 2, 2002 that shows the number of employees in a company as of Jan. 1, 2002. The same report is run on January 15$^{th}$ and shows a different number of employees because the database has been updated with events that occurred before January 1st but had not been applied by January 2nd. The report is run later and shows a different count. As time goes on, the reported number continues to change becoming ever more reflective of the actual state of the real world on the date in question. With the five-field structure, it is difficult to construct queries that select on both event times and database times. This problem can become much more severe when queries are complex involving the coordinated selection of several tables where each has the five-field structure.

Because a database is often changing as transactions are added, running a query at two different times can produce different results, even running a query a few minutes later can produce different results. When several queries are run with the same as of date, as might happen at the end of the month or quarter, the queries might produce different results even though they are similar. Unless the database management system provides an option to eliminate updates that are performed while a query is running (Repeatable Read), erroneous results can be obtained due to the database being updated while a query is running. However, such options can be expensive in large databases. These problems have led many companies to make copies of their databases in order to produce both consistent results and eliminate or incorporate corrected records. Having various versions of databases is both expensive and cumbersome. And if a copy of the database was not made at some point, it may not be possible to recreate the database.

Consequently, there is a need in the art for a data structure that can support retroactive processing, regression of history databases, and repeatable query execution. There also exists a need for a system to produce and to use such a data structure. The present invention meets these needs.

BRIEF DESCRIPTION OF THE FIGURES

The present application can be best understood by reference to the following description taken in conjunction with the accompanying drawing figures, in which like parts may be referred to by like numerals.

DETAILED DESCRIPTION OF PREFERRED EMBODIMENTS

Figure 1:
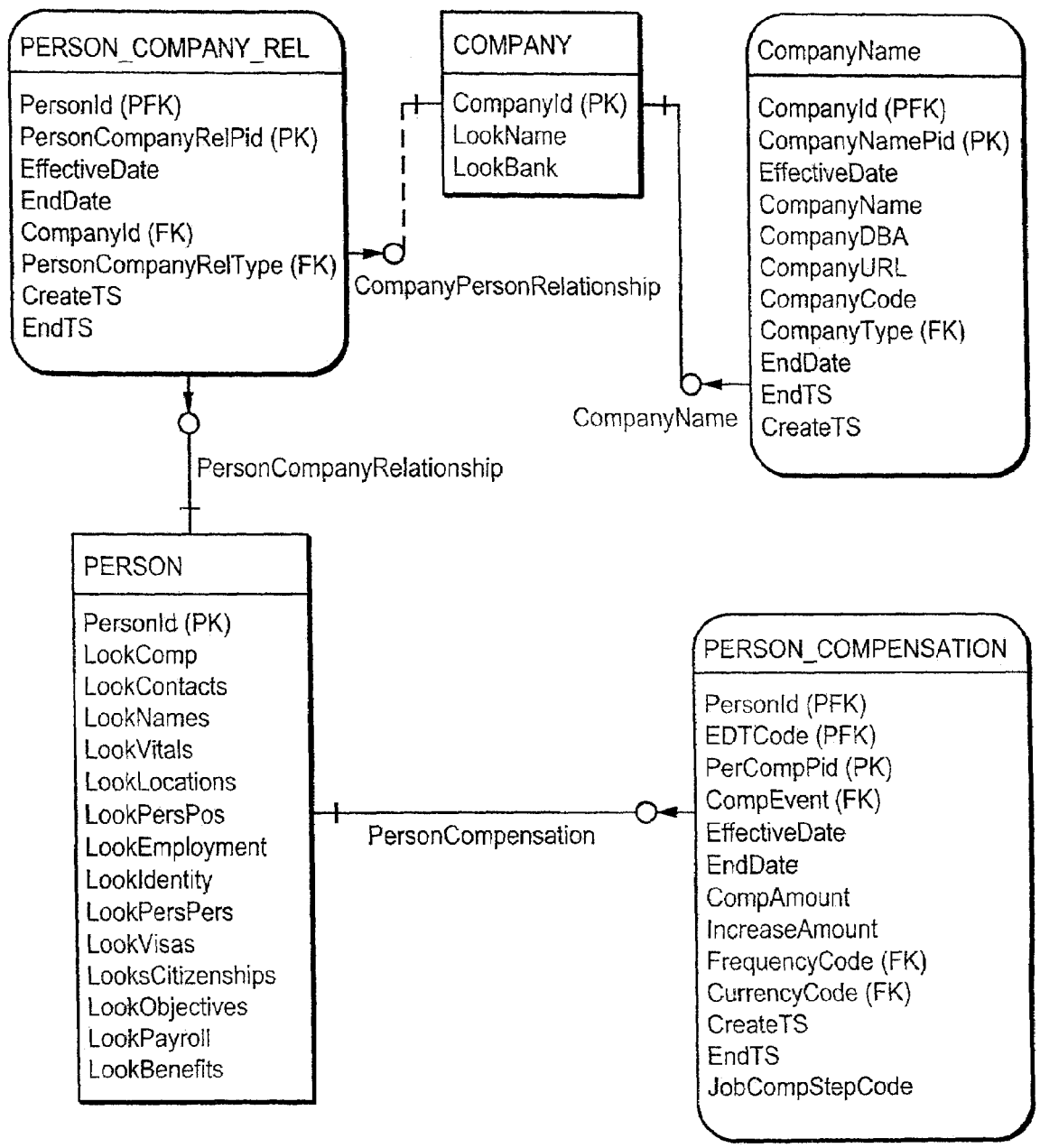
FIG. 1 illustrates an exemplary set of tables in a relational database encoded in computer readable memory.

The following description is presented to enable any person skilled in the art to make and use a system and method for use of time-chains to retrieve current database states and to retrieve prior database states. The description discloses the system and method in accordance with embodiments of the invention and in the context of particular applications and their requirements. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and processes are shown in block diagram form in order not to obscure the description of the invention with unnecessary detail. Thus, the present invention is not intended to be limited to the embodiments shown, but is to be accorded the widest scope consistent with the principles and features disclosed herein.

Introduction:

Some embodiments of the present invention involve methods and data structures for representing time effective data and database active data using a computer system and storing data in these structures as changes are applied to a database. The queries against the data may be as complex as the various tables involved can support and still provide a consistent view of the data on either or both of the time dimensions selected. The queries based upon the structure and method may refer to any regression point, including the present moment, and provide consistent results even as the database is undergoing dynamic changes.

In the practice some embodiments of the invention, the structure of the Time Relational Data Model consists of two kinds of dates. One kind—an Effective Date and an optional End Date—reflect the real world time-period for which the record applies—the Effective Period. If only an Effective Date is used the period is dynamically calculated. The second dates, a set of two—Create Timestamp and End Timestamp—reflect the time-period that the record applies to the database—the Database Active Period. The Record Status field, present in prior implementations, is eliminated in the invention.

The Effective Date records the real world date-time of the event giving rise to a record. The Effective Date, like all the state variables of a history record, is immutable—cannot be changed. The End Date is a date-time field that is set to either the indefinite future or an instant prior to the Effective Date of the subsequent record. The Create Timestamp is filled with the transaction date-time when the record is first stored in the database as in prior implementations. This field is immutable. The End Timestamp is initially set to a date far in the future representing the indefinite future. The End Timestamp is set to the Create Timestamp of a replacement record that corrects a record or set to the transaction time of a transaction that logically deletes the record.

If a record's End Date is updated and there is no subsequent history, then the record is copied, the old copy is marked with an End Timestamp and the copy is marked with the same Create Timestamp. Since this is the only case where copies of records are required and, in most applications using the Time Relational Data Model the number of such updates is small, this process produces the least duplication while providing thorough regression capability.

Updates to a subject's history with are performed in a database in the same unit of work.

Queries that wish to select records that are active as of a point in time select against the Create Timestamp and the End Timestamp. Records that are not active as of the date-time of the selection, will not satisfy the query. Queries that select records that are effective as of a particular date-time select against the Effective Date and the End Date or a calculated End Date obtained by accessing the record with the next highest Effective Date. Queries that select only records that are active as of the present time can query using the system time since no records could be present in the database with higher Create Timestamps.

For regression queries—those specifying a database active date-time earlier than the system time—the query must search the subsequent histories that form a causal chain in order to find the End Date that applied to the record at a prior time.

Some embodiments of the invention provides the ability to recreate the state of a database as of any arbitrary point in time without having to make copies; the ability to form queries that can produce consistent results even as a database is being dynamically updated; and the ability to easily join together various time relational tables in a time consistent manner. These advantages are achieved with a minimum of duplicate records and little additional query time.

In some embodiments, the data structures are maintained as relational tables. The four date-time fields are stored as data-time or timestamp data types. And queries for selection of records are stated in the SQL language.

These and other objects, advantages, and features of the present invention will become apparent from the following detailed description when taken in conjunction with the accompanying figures.

Example Relational Tables:

FIG. 1 is an illustrative drawing of tables in a relational database in encoded in computer readable memory in accordance with some embodiments of the invention. In these tables, the CompanyName database table illustrates a table in the Time Span model with a primary key of (CompanyId) and a Period Id (CompanyNamePid). It contains the four dates of the model having Effective Date (EffectiveDate), End Date (EndDate), Create Timestamp (CreateTS), and End Timestamp (EndTS). This table is a simple history meaning that the state attributes CompanyName, CompanyDBA, CompanyURL, CompanyType are dependent only on the Period Id.

In FIG. 1, the table PERSON_COMPENSATION is another example of a Time Span model where the primary key is PersonId, EDTCode, and PerCompPid. The four dates of the model are present. The attribute EDTCode is a sub-key meaning that the state attributes (CompAmount, IncreateAmount, FrequencyCode, CurrencyCode, and JobCompStepCode) are dependent upon the Period Id and EDTCode.

In FIG. 1, the table PERSON_COMPANY_REL illustrates a table that is in the Time Span model where the table is dependent upon two other tables, PERSON and COMPANY. This table stores the history of the relationships between instances of these two tables.

Figure 2:
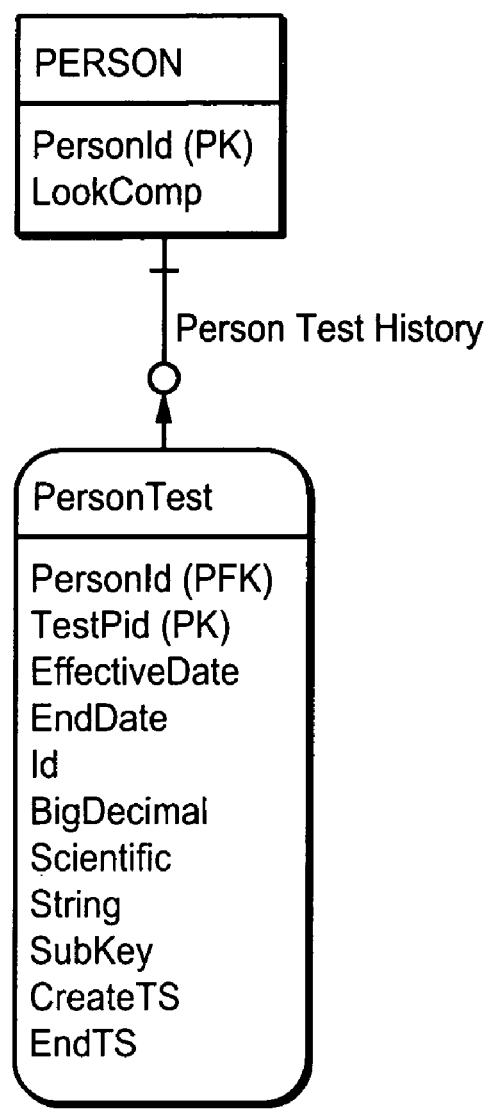
FIG. 2 illustrates another exemplary set of tables.

FIG. 2 is an illustrate drawing of a more simple set of relations in accordance with some embodiments of the invention. The primary keys in the tables of FIG. 2 are PersonId and TestPid. The four dates of the model are EffectiveDate, EndDate, CreateTS, and EndTS.

Time-Chain Process:

A time-chain creation process in accordance with some embodiments of the invention operates as follows. The processes for determining the EffDT-EndDT pair and the createts-endts pair are independent. The effdt is always input from an external source, such as a user or another system, based on the event and is immutable. The EndDT of a record that spans the effdt of a new event record is always set to the effdt-1 of the new event record. The createts of a record is always set to the time that record is written to the database and is immutable. The endts is always set to the indefinite future when a record is initially created. The EndDate of a new event record is set to the indefinite future if there is no intersecting record (the first-time case) or the EffDT-1 of the intersecting record. The initial setting of one pair is not dependent on the other pair. The time-chain is created by the EndDT-1=EffDT relationship within an entity key. In the continuous history case, the addition of a new event record causes one new record and the update of the Enddt of the prior record. Starting with one record with a Effdt-Enddt time span and the addition of a record with an Effdt in the time span, two records result: the original with its Enddt set to new Effdt-1, and the new record with its createts set to the time of the transaction.

Figure 3:
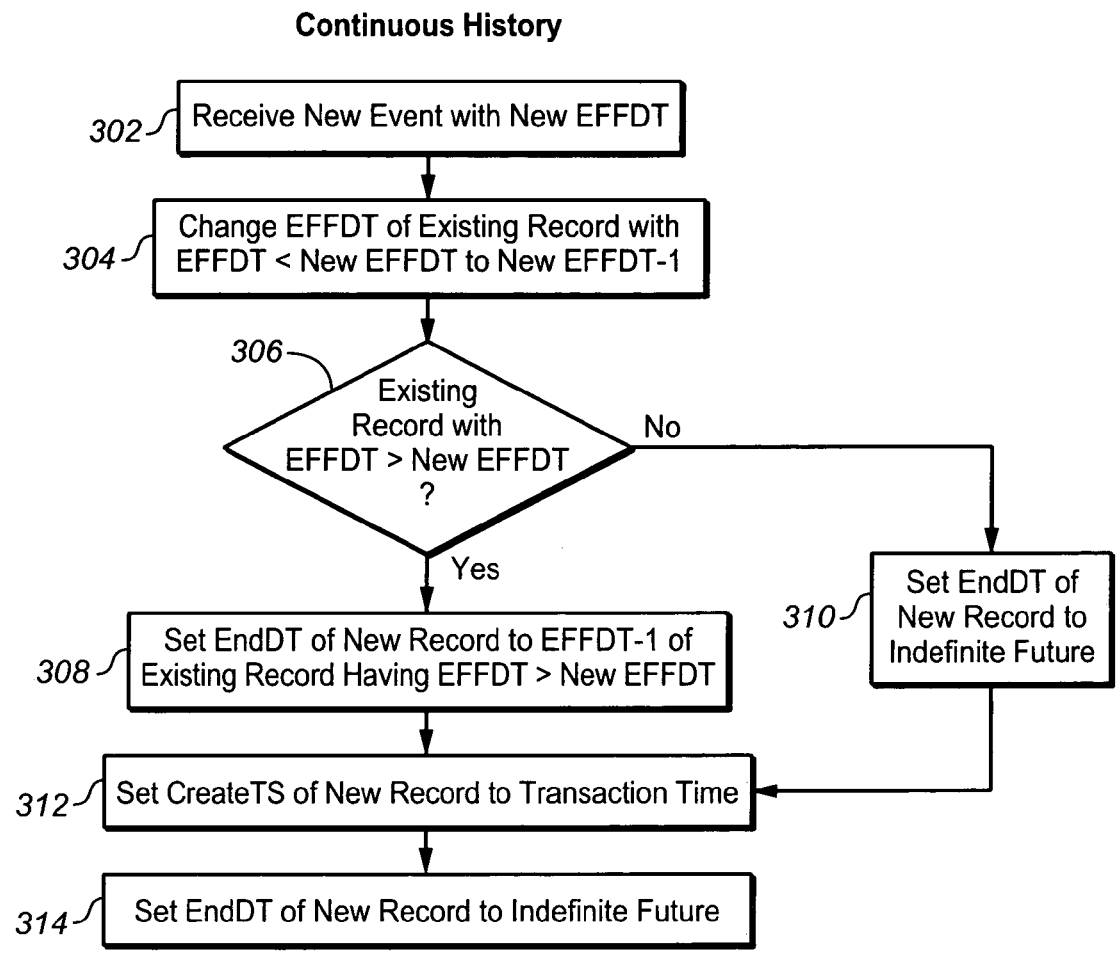
FIG. 3 illustrates an exemplary flow diagram of a time chain creation process to produce a time chain in a continuous history.

FIG. 3 is an illustrative flow diagram of a time cahin creation process to produce a time chain in a continuous history. FIG. 3 represents a computer program process that can be encoded in computer readable memory. In step 302, a new event occurs with a new effective date/time (EffDT). In step 304, the EffDT of an existing record with an EffDT<new EffDT is changed to new EffdT-1. In decision step 306, a determination is made as to whether there is an existing record with an EffDT>new EffDT. If so (yes), then in step 308, the EndDT of the new record is set to a value of that existing EffdT-1. If not (no), then in step 310 the EndDT of the new record is set to the indefinite future. In step 312, the create time stamp (CeateTS) of the new record is set to the transaction time. In step 314, the end date/time (EndDT) of the new record is set to the indefinite future.

Figure 4:
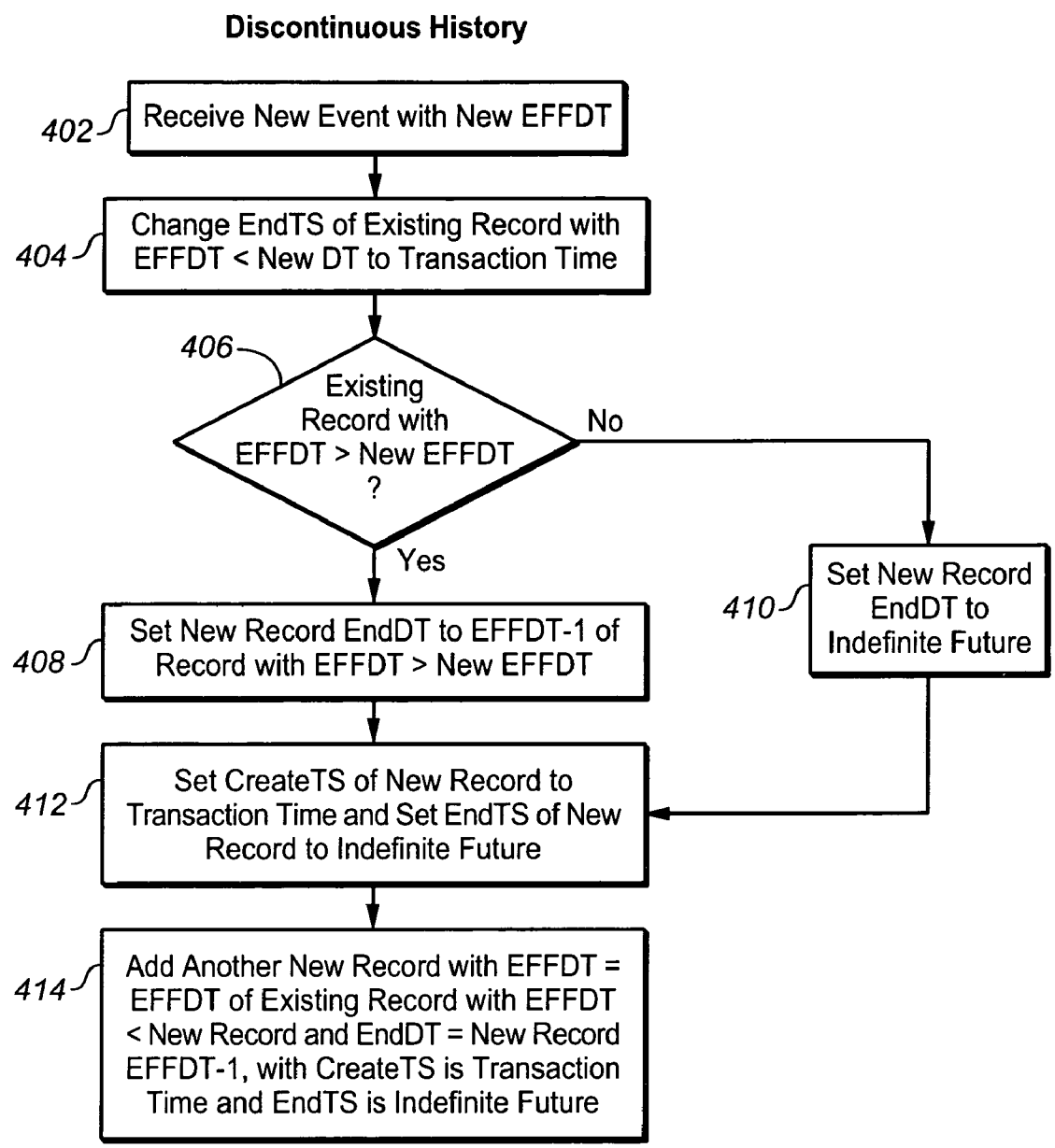
FIG. 4 illustrates an exemplary flow diagram of a time chain creation process to produce a time chain in a discontinuous history.

FIG. 4 is an illustrative flow diagram of a time cahin creation process to produce a time chain in a discontinuous history. FIG. 4 represents a computer program process that can be encoded in computer readable memory. In step 402, a new event occurs with a new effective date/time (EffDT). In step 404, the EndTS of an existing record with an EffDT<new EffDT is changed to transaction time. In decision step 406, a determination is made as to whether there is an existing record with an EffDT>new EffDT. If so (yes), then in step 408, the EndDT of the new record is set to is set to a value of that existing EffDT-1. In not (no), then in step 410, the EndDT of the new record is set to indefinite future. In step 412, the CreateTS of the new record is set to the transaction time, and the EndTS of the new record is set to the indefinite future. In step 414, another new record is added with EffDT=EffDT of the existing record with the earlier EffDT and with EndDT=new record EffDT and with CreateTS=transaction time and with EndTS=indefinite future.

Figure 5:
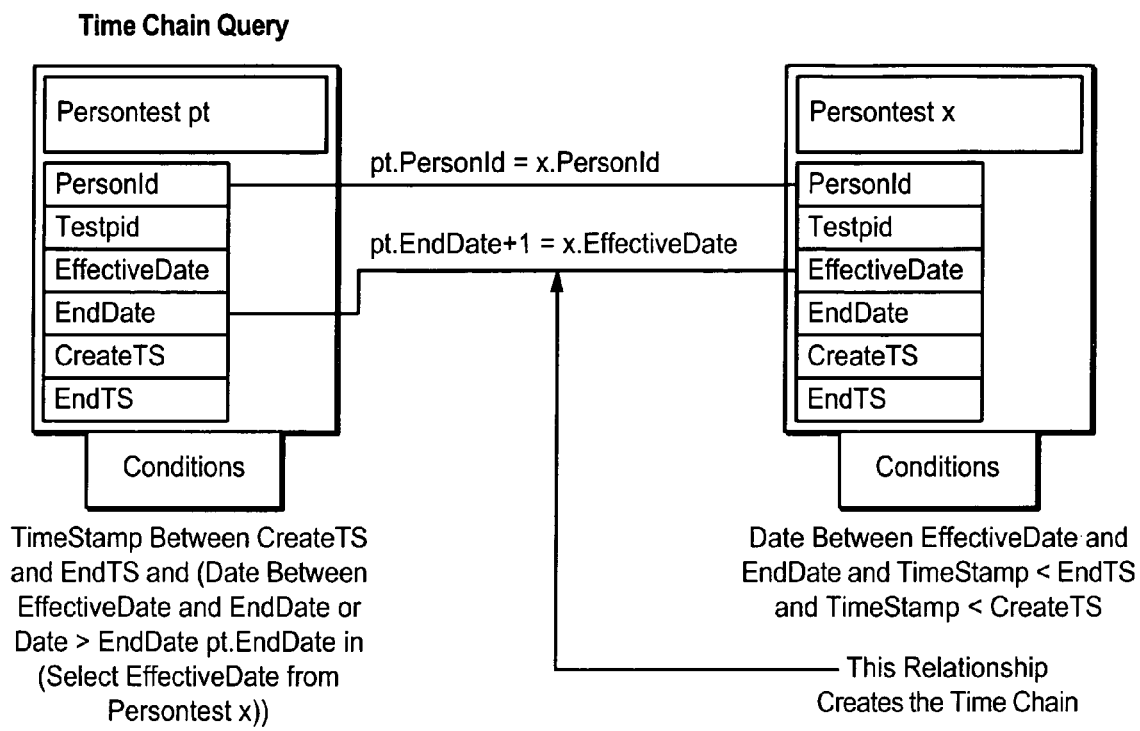
FIG. 5 illustrates an exemplary time chain relation.

FIG. 5 is a grahical example of time chain relations in accordance with some embodiments of the invention.

Continuous History Examples:

The following examples are based upon the PersonTest tables illustrated in FIG. 2. This is a Time Span implementation. The primary keys are PersonId and TestPid. The four dates of the model are EffectiveDate, EndDate, CreateTS, and EndTS.

It will be appreciated that the following tables may be encoded in computer readable memory where they may serve as data structures that may be part of a relational database system.

First Continuous History Example

| PersonId | Testpid | Effectivedate | Enddate | CreateTS | EndTS | id |
|---|---|---|---|---|---|---|
| 1 | 1 | Jan. 1, 2005 | Dec. 31, 2199 | Feb. 1, 2005 | Dec. 31, 2199 | A1 |
| 2 | 1 | Jan. 1, 2005 | Feb. 28, 2005 | Feb. 1, 2005 | Dec. 31, 2199 | A2 |
| 2 | 2 | Mar. 1, 2005 | Dec. 31, 2199 | Feb. 25, 2005 | Dec. 31, 2199 | B2 |

PersonId 1, record with id of A1 represents the history prior to being updated by a transaction that has an Effective Date of Mar. 1, 2005. PersonId 2, records with ids of A2 and B2, represent the same history after update by the transaction of B2.

In the data store of this first continuous history example, the record 1 1 is the original record created when the original event occurred. The record 1 1 has an EndDT set as the indefinite future (in this case represented as Dec. 31, 2199). A date in the indefinite future is a date for all practical purposes is far enough out so that event occurrences at or beyond that date are unlikely or not of practical concern. Ordinarily the keys of a record are either the keys of the database entity to which the history is related—e.g., PersonId, or an arbitrary key that provides uniqueness—e.g. testpid In this first continuous history example, the first entry (1) in the key 1 1 can be construed as a before/after indicator: 1=before. The second entry (1) in the key 1 1 can be interpretted as an original/new record indicator: 1=original record.

| PersonId | Testpid | Effectivedate | Enddate | CreateTS | EndTS | id |
|---|---|---|---|---|---|---|
| 1 | 1 | Jan. 1, 2005 | Dec. 31, 2199 | Feb. 1, 2005 | Dec. 31, 2199 | A1 |

In the data store of this first continuous history example, the record 2 1 is an update of the original record 1 1 and has an updated EndDT and that is produced upon the occurrence of a new event. The EndDT of record 2 1 is updated to be one time period prior to the EffDT of the new event (i.e. new EffDT-1, in this case Feb. 28, 2005). The first entry (2) in the key 2 1 can be construed a before/after indicator: 2=after. The second entry (1) in the key 2 1 can be interpreted as an original/new record indicator: 1=original record.

| PersonId | Testpid | Effectivedate | Enddate | CreateTS | EndTS | id |
|---|---|---|---|---|---|---|
| 2 | 1 | Jan. 1, 2005 | Feb. 28, 2005 | Feb. 1, 2005 | Dec. 31, 2199 | A2 |

Both records 1 1 and 2 1 are associated with the original event. Record 1 1 exists in its original form in the data store after the occurrence of the original event and before the ocurrence of the new event. Record 2 1 is an update of record 1 1. Record 2 1 exists in the database after the occurrence of a new event. Thus, record 1 1 and record 2 1 represent the same (original) event over different time intervals.

In the data store of the first continuous history example, the record 2 2 is a new record produced upon the occurrence of a new event. Record 2 2 is associated with that new event. The new record 2 2 has an EffDT equal to the effective date of the new event. The new record 2 2 has a CreateTS equal to the time when the new record 2 2 was entered in the data store. The EndDT and the EndTS of the new record 2 2 are set to the indefinite future (in this example Dec. 31, 2199). The first entry (2) in the key 2 2 can be construed as a before/after indicator: 2=after. The second entry (2) in the key 2 2 can be interpreted as an original/new record indicator: 2=new record.

| PersonId | Testpid | Effectivedate | Enddate | CreateTS | EndTS | id |
|---|---|---|---|---|---|---|
| 2 | 2 | Mar. 1, 2005 | Dec. 31, 2199 | Feb. 25, 2005 | Dec. 31, 2199 | B2 |

Thus, a time chain is exists from the record 2 1, which records the EndDT of the prior (original) event, to the record 2 2 which includes the EffDT of the new event. Specifically, the time chain spans from the EndDT=Feb. 28, 2005 in record 2 1 to the effDT=Mar. 1, 2005 in record 2 2.

Second Continuous History Example:

Assume, for example, that before the occurrence of a new event, the data store below includes two records, record 3 1 which is associated with an original event and record 3 2 which is associated with a prior next event.

| PersonId | Testpid | Effectivedate | Enddate | CreateTS | EndTS | id |
|---|---|---|---|---|---|---|
| 3 | 1 | Mar. 1, 2005 | Jun. 1, 2005 | Dec. 1, 2005 | Dec. 31, 2199 | |
| 3 | 2 | Jun. 2, 2005 | Dec. 31, 2199 | Jun. 15, 2005 | Dec. 31, 2005 | |

There is a time chain relationship between the EndDT=Jun. 1, 2005 of record 3 1 and the EffT=Jun. 2, 2005 of record 3 2: enddt+1=effdt. (Note that the naming convention described above with reference to the first continuous history example is not used for the keys in records 3 1, 3 1, and 3 3 of this second continuous history example.)

Further, assume the occurrence of a new event (different from the events that produced records 3 1 and 3 2). Assume that the new event has EffDT=Jun. 1, 2005 and CreateTS=Jun. 15, 2005. The new event has an effective date time interval (from the start of its effective date (EffDT) that is spanned by 3 1. In other words, the effective time interval (between EffDT=Mar. 1, 2005 and EndDT=Dec. 31, 2199) of record 3 1 overlaps with the effective time interval of the new event, which begins at EffDT=Jun. 1, 2005. Therefore, record 3 1 is updated so that its EndDT is set equal to May. 31, 2003 (EndDT=May 31, 2003), i.e. equal to new event EffDT-1). The new record is written as 3 3. The new record has an EndDT=Jun. 1, 2005 which is immediately prior to the EffDT=Jun 2, 2005 of record 3.2. The record 3 3 has its EndTS set to the indefinite future. Record 3 2 is unaffected since it does not span the new EffDT of the new record 3 3.

The resulting data store is as follows (new and changed record entries are shown in bold.):

| PersonId | Testpid | Effectivedate | Enddate | CreateTS | EndTS | id |
|---|---|---|---|---|---|---|
| 3 | 1 | Mar. 1, 2005 | May 31, 2005 | Dec. 1, 2005 | Dec. 31, 2199 | |
| 3 | 2 | Jun. 2, 2005 | Dec. 31, 2199 | Jun. 15, 2005 | Dec. 31, 2005 | |
| 3 | 3 | Jun. 1, 2005 | Jun. 1, 2005 | Jun. 15, 2005 | Dec. 31, 2199 | |

Therefore, a time chain is produced that goes from 31 to 3 3 and from 3 3 to 3 2. More specifically, the time chain goes from EndDT of 3 1 to EffDT of 3 3 and from 3 3 to EffDT of 3 2: 3 1 EndDT (5/31)+1=3 3 EffDT (6/1); and 3 3 EndDT (6/1)+1=3 2 EffDT (6/2).

Third Continuous History Example:

In this example, assume that the data store has the following single record 3 1 prior to an occurrence of a next new event.

| PersonId | Testpid | Effectivedate | Enddate | CreateTS | EndTS | id |
|---|---|---|---|---|---|---|
| 3 | 1 | Mar. 1, 2005 | Dec. 31, 2199 | Dec. 1, 2005 | Dec. 31, 2199 | |

Assume the occurrence of a next new event having EffDT=Jun. 1, 2005 and CreateTS=Jun. 15, 2005. Applying the above rules for updating continuous histories, the following records result (new and changed record entries are shown in bold.).

| PersonId | Testpid | Effectivedate | Enddate | CreatetS | EndtS | id |
|---|---|---|---|---|---|---|
| 3 | 1 | Mar. 1, 2005 | May 31, 2005 | Dec. 1, 2005 | Dec. 31, 2199 | |
| 3 | 3 | Jun. 1, 2005 | Dec. 31, 2199 | Jun. 15, 2005 | Dec. 31, 2199 | |

Note that the resulting updated record 3 1 is the same for both the second and third continuous history examples. Thus, effect of the new event upon record on 3 1 is the same whether 3 2 above exists or not. However, in the third continuous history example, the record 3 3 has its EndDT set to the indefinite future (Dec. 31, 2199 in this example) since there is not intersecting record (such as record 3 2, which is an intersecting record in the second continuous history example).

Example Queries Applied to the First Continuous History Example:

The query, "A"

```
select * from persontest where personid < 3
    and to_date('2/1/2005','mm/dd/yyyy') between EffectiveDate and EndDate
    and to_date('2/21/2005','mm/dd/yyyy') between CreateTS and EndTS.
```

Produces the correct result:

| Personid | Testpid | Effectivedate | enddate | Createts | Endts | id |
|---|---|---|---|---|---|---|
| 1 | 1 | Jan. 1, 2005 | Dec. 31, 2199 | Feb. 1, 2005 | Dec. 31, 2199 | A1 |
| 2 | 1 | Jan. 1, 2005 | Feb. 28, 2005 | Feb. 1, 2005 | Dec. 31, 2199 | A2 |

And the query, "B"

```
select * from persontest where personid < 3
    and to_date('2/1/2005','mm/dd/yyyy') between EffectiveDate and
    EndDate
    and to_date('2/26/2005','mm/dd/yyyy') between CreateTS and EndTS.
```

Produces the correct result:

| Personid | Testpid | Effectivedate | enddate | Createts | Endts | id |
|---|---|---|---|---|---|---|
| 1 | 1 | Jan. 1, 2005 | Dec. 31, 2199 | Feb. 1, 2005 | Dec. 31, 2199 | A1 |
| 2 | 1 | Jan. 1, 2005 | Feb. 28, 2005 | Feb. 1, 2005 | Dec. 31, 2199 | A2 |

But the query, "C"

```
select * from persontest where personid < 3
    and to_date('3/1/2005','mm/dd/yyyy') between EffectiveDate and
    EndDate
    and to_date('2/24/2005','mm/dd/yyyy') between CreateTS and EndTS
```

Produces the incorrect result:

| personid | Testpid | effectivedate | enddate | createts | Endts | id |
|---|---|---|---|---|---|---|
| 1 | 1 | Jan. 1, 2005 | Dec. 31, 2199 | Feb. 1, 2005 | Dec. 31, 2199 | A1 |

This result shows the failure of this form of the query to produce reliable regressions.

Time-Chain Query:
A solution is to modify the query as follows: "D"

```
select * from persontest pt where personid < 3
    and to_date('2/24/2005','mm/dd/yyyy') between pt.CreateTS and
    pt.EndTS (1)
```

-continued

```
    and (to_date('3/1/2005','mm/dd/yyyy') between pt.EffectiveDate
    and pt.EndDate (2)
        or ((to_date('3/1/2005','mm/dd/yyyy') > pt.EndDate (3)
            and pt.enddate+1 in
                (select EffectiveDate from persontest x (4)
                where pt.personid = x.personid
                and to_date('3/1/2005','mm/dd/yyyy') between x.EffectiveDate
```

-continued

```
                and x.EndDate (5)
                and to_date('2/24/2005','mm/dd/yyyy') < x.EndTS (6)
                and to_date('2/24/2005','mm/dd/yyyy') < x.CreateTS)))) (7)
```

Which produces the correct result:

| Personid | Testpid | effectivedate | enddate | createts | Endts | Id |
|---|---|---|---|---|---|---|
| 1 | 1 | Jan. 1, 2005 | Dec. 31, 2199 | Feb. 1, 2005 | Dec. 31, 2199 | A1 |
| 2 | 1 | Jan. 1, 2005 | Feb. 28, 2005 | Feb. 1, 2005 | Dec. 31, 2199 | A2 |

While this query is more complex than the earlier queries it is not significantly more expensive. Most of the desired records will be selected by clauses (1) and (2). Only if that fails will clause (3) be examined; (3) will eliminate those records where the effective date is above the as of date. That includes all records that are at the end of the chain. Sub-query (4) looks for the case where the record in question has been supplanted by a record that caused its End Date to be updated. That record will have an Effective Date equal to the End Date plus one of the current record (4). Additionally, its Effective Date and End Date must bound the as of date (5); it cannot have been undone prior to the regression time, i.e., its End Timestamp must be greater than the regression time (6); and it must have been created after the regression time (7). Clause (5) also eliminates null period records from consideration since they have End Date prior to Effective Date.

When the End Date is updated in a discontinuous history, a similar problem results.

First Discontinuous History Example:

| PersonId | testpid | effectivedate | enddate | CreateTS | EndTS | Id |
| --- | --- | --- | --- | --- | --- | --- |
| 1 | 1 | Jan. 1, 2005 | Dec. 31, 2199 | Feb. 1, 2005 | Dec. 31, 2199 | A1 |
| 2 | 1 | Jan. 1, 2005 | Feb. 28, 2005 | Feb. 1, 2005 | Dec. 31, 2199 | A2 |
| 3 | 1 | Jan. 1, 2005 | Dec. 31, 2199 | Feb. 1, 2005 | Feb. 25, 2005 | A1 |
| 3 | 2 | Jan. 1, 2005 | Feb. 28, 2005 | Feb. 25, 2005 | Dec. 31, 2199 | A2 |

In this example, PersonId 1 represents the data prior to any update. PersonId 2 shows how the records would look if the initial Synchronicity model were used. PersonId 3 shows the records as they would look in the revised model.

In this first discontinuous history example the time chain query operates correctly, but there is no EffectiveDate to EndDate chain, because the event being described is the ending of a time period rather than a new event. This kind of update occurs on discontinuous histories—that's why they are called discontinuous—but the structure makes it possible for a regression query like the query "D" to operate correctly.

Second Discontinuous History Example:

Using the same records as the above second continuous history example—records 3 1 and 3 2 preexisting, the rule for discontinuous histories is the same as for continuous histories with one exception. Instead of a spanning record, such as record 3 1, having its EndDT updated, such spanning record such as 3 1, has its EndTS set to the database transaction time (i.e. CreateTS) and a new record (record 3 4 in this example) is written with its EndDT=EffDT-1 of the new event record (record 3 3 in this example).

More particularly, assume, for example, that before the occurrence of a next new event, the data store below includes two records, record 3 1 which is associated with an original event and record 3 2 which is associated with a prior next event. Further assume that the new next event has EffDT=Jun. 1, 2005 and CreateTS=Jun. 15, 2005.

| PersonId | testpid | effectivedate | enddate | CreateTS | EndTS | Id |
| --- | --- | --- | --- | --- | --- | --- |
| 3 | 1 | Mar. 1, 2005 | Jun. 1, 2005 | Dec. 1, 2005 | Dec. 31, 2199 | |
| 3 | 2 | Jun. 2, 2005 | Dec. 31, 2199 | Jun. 15, 2005 | Dec. 31, 2005 | |

The resulting data store is as follows (new and changed record entries are shown in bold.):

| PersonId | testpid | effectivedate | enddate | CreateTS | EndTS | Id |
| --- | --- | --- | --- | --- | --- | --- |
| 3 | 1 | Mar. 1, 2005 | Jun. 1, 2005 | Dec. 1, 2005 | Jun. 15, 2005 | |
| 3 | 2 | Jun. 2, 2005 | Dec. 31, 2199 | Jun. 15, 2005 | Dec. 31, 2005 | |
| 3 | 3 | Jun. 1, 2005 | Jun. 1, 2005 | Jun. 15, 2005 | Dec. 31, 2199 | |
| 3 | 4 | Mar. 1, 2005 | May 31, 2005 | Jun. 15, 2005 | Dec. 31, 2199 | |

Note that records 3 3 are the same in the second continuous history example and in the second discontinuous history example, since each of these records 3 3 has an intersecting event, which is represented by record 3 2 in each of these two examples. Record 3 1 in the second discontinuous history example has its EndTS set equal to the record 3 4 CreateTS, which is Jun. 15, 2005. The EndTS of record 3 4 is set to the indefinite future (represented as Dec. 31, 2199).

Thus, a time chain is produced from 3 4 to 3 3 and from 3 3 to 3 2. That is, the tome chain goes from EndDT=May 31, 2005 of 3 4 to EffDT=Jun. 1, 2005 of 3 3 and from EndDT=Jun. 1, 2005 of 3 3 to EffDT=Jun. 2, 2005 of 3 2. The EndTS=Jun. 15, 2055 of 3 1 is the end of the database period for that record, the time after which is no longer considered valid in the database. It means that queries selecting in times after that date will not select that record.

Third Discontinuous History Example:

In this example, assume that the data store has the following single record 3 1 prior to the occurrence of a next new event.

| PersonId | testpid | effectivedate | enddate | CreateTS | EndTS | Id |
|---|---|---|---|---|---|---|
| 3 | 1 | Mar. 1, 2005 | Dec. 31, 2199 | Dec. 1, 2005 | Dec. 31, 2199 | |

Assume the occurrence of a new next event having EffDT=Jun. 1, 2005 and CreateTS=Jun. 15, 2005. Applying the above rules for updating continuous histories, the following records result (new and changed record entries are shown in bold.).

| PersonId | testpid | effectivedate | enddate | CreateTS | EndTS | Id |
|---|---|---|---|---|---|---|
| 3 | 1 | Mar. 1, 2005 | Jun. 1, 2005 | Dec. 1, 2005 | Jun. 15, 2005 | |
| 3 | 3 | Jun. 1, 2005 | Dec. 31, 2199 | Jun. 15, 2005 | Dec. 31, 2199 | |
| 3 | 4 | Mar. 1, 2005 | May 31, 2005 | Jun. 15, 2005 | Dec. 31, 2199 | |

Record 3 1 is the same as in the second discontinuous history example. Record 3 3 is the same as record 3 2 of the third continuous history example. Record 3 4 is the same as record 3 4 of the second discontinuous example.

Thus, a time chain is produced that goes from 3 4 to 3 3. Specifically, the time chain goes from EndDT=May 31, 2005 of 3 4 to EffDT=Jun. 1, 2005 of 3 3.

Example Queries Applied to the First Discontinuous History Example:

Query "A" result:

| Personid | testpid | effectivedate | enddate | createts | endts | Id |
|---|---|---|---|---|---|---|
| 1 | 1 | Jan. 1, 2005 | Dec. 31, 2199 | Feb. 1, 2005 | Dec. 31, 2199 | A1 |
| 2 | 1 | Jan. 1, 2005 | Feb. 28, 2005 | Feb. 1, 2005 | Dec. 31, 2199 | A2 |
| 3 | 1 | Jan. 1, 2005 | Dec. 31, 2199 | Feb. 1, 2005 | Feb. 25, 2005 | A1 |

As above, this query "A" produces the desired result.

Query "B" result:

| Personid | testpid | effectivedate | enddate | createts | endts | Id |
|---|---|---|---|---|---|---|
| 1 | 1 | Jan. 1, 2005 | Dec. 31, 2199 | Feb. 1, 2005 | Dec. 31, 2199 | A1 |
| 2 | 1 | Jan. 1, 2005 | Feb. 28, 2005 | Feb. 1, 2005 | Dec. 31, 2199 | A2 |
| 3 | 2 | Jan. 1, 2005 | Feb. 28, 2005 | Feb. 25, 2005 | Dec. 31, 2199 | A2 |

And this query "B" also produces the desired result with the unaltered record and the two model variants.

As above query "C" produces undesirable results using the initial model:

| Personid | testpid | effectivedate | enddate | createts | endts | Id |
|---|---|---|---|---|---|---|
| 1 | 1 | Jan. 1, 2005 | Dec. 31, 2199 | Feb. 1, 2005 | Dec. 31, 2199 | A1 |
| 3 | 1 | Jan. 1, 2005 | Dec. 31, 2199 | Feb. 1, 2005 | Feb. 25, 2005 | A1 |

The Initial Synchronicity Model (PersonId=2) fails. But the improved model (PersonId=3) provides the desired result.

The improved model also produces the desired result with "D" above, the Time-Chain query:

| personid | testpid | effectivedate | enddate | createts | endts | Id |
|---|---|---|---|---|---|---|
| 1 | 1 | Jan. 1, 2005 | Dec. 31, 2199 | Feb. 1, 2005 | Dec. 31, 2199 | A1 |
| 3 | 1 | Jan. 1, 2005 | Dec. 31, 2199 | Feb. 1, 2005 | Feb. 25, 2005 | A1 |

This result shows that the Time-Chain query is not sufficient to provide a regressed query in this case. That is because without copying and time-stamping the update, there is not adequate information in the database to reconstruct the past. For continuous histories this case does not arise since there is always a most future record. For discontinuous histories, updates of the End Date are rare for many functional areas and hence the impact on the database should be minimal.

This regression query problem only exists when a query is a true regression, that is the regression date is prior to the current time.

If we substitute current_timestamp for the regression date into query ("D") it looks like:

```
select * from persontest pt where personid < 4
    and current_timestamp between pt.CreateTS and pt.EndTS
    and (to_date('3/1/2005','mm/dd/yyyy') between pt.EffectiveDate
        and pt.EndDate or ((to_date('3/1/2005','mm/dd/yyyy') >
        pt.EndDate
        and pt.enddate+1 in
            (select EffectiveDate from persontest x
                where pt.personid = x.personid
                and to_date('3/1/2005','mm/dd/yyyy') between x.EffectiveDate
                and x.EndDate and current_timestamp < pt.EndTS
                and current_timestamp < x.CreateTS)))) (10)
```

But line 10 cannot happen since there can be no timestamp greater than the current_timestamp. So query D becomes:

```
select * from persontest pt where personid < 4
    and current_timestamp between pt.CreateTS and pt.EndTS
    and to_date('3/1/2005','mm/dd/yyyy') between pt.EffectiveDate and
    pt.EndDate.
```

Current_timestamp is a value set at the time of the query and so if an update takes place after the query starts, but before the record is retrieved, this shorter form could produce undesirable results. This problem is solved by using a repeatable read query. Such a query uses a stable view of the data and so no updates will intervene. In an interactive environment using read committed, protection from retrieval errors due to current_timestamp inconsistencies can be achieved by using an optimistic lock mechanism as is proposed in the Synchronicity model.

Since in many applications the requirement is from the 'latest' record from a history, a query that will retrieve that is:

```
select * from persontest
    where EndDate = to_date('12/31/2199','mm/dd/yyyy')
    and current_timestamp between CreateTS and EndTS.
```

This query is 'safe' in that it will retrieve one and only one record for each history chain as long as a single unit of work updates all the records in the chain. The nature of the timestamps places this additional requirement on the model.

The query in "D" works only for the case where the subsequent update is only one record away from the record that was effective as of the regression date. This query generalizes two records away as the following query, which uses a pivot table, shows:

```
select * from persontest pt
    cross join Asof R
    cross join Asof E
    where
        R.AsofDate = to_date('2/24/2005','mm/dd/yyyy')
        and E.AsofDate = to_date('4/1/2005','mm/dd/yyyy')
        and R.AsofDate between pt.CreateTS and pt.EndTS
        and (E.AsofDate between pt.EffectiveDate and pt.EndDate
            or (E.AsofDate > pt.EndDate
            and (pt.enddate+1 in
                (select EffectiveDate from persontest x
                    where pt.personid = x.personid
                    and E.AsofDate between x.EffectiveDate and x.EndDate
                    and R.AsofDate < pt.EndTS
                    and R.AsofDate < x.CreateTS))
            or (pt.enddate+1 in
            (select y.EffectiveDate from persontest y
                join persontest z
                    on y.personid = z.personid
                    and y.EndDate+1 = z.EffectiveDate
                    and R.AsofDate < z.CreateTS
                    and E.AsofDate between z.EffectiveDate and z.EndDate
                where R.AsofDate < y.CreateTS))))
```

In order to reliably perform a regression it is necessary to know the magnitude of the chain. The following query, which uses the view PersonTestCount, provides a count of the magnitude.

```
Create or replace view PersonTestCount as
select personid, count(pt.personid) as chaincount
    from persontest pt
        where pt.enddate+1 in
            (select effectivedate from persontest t
            where pt.personid = t.personid)
        group by personid
    select max(chaincount) from persontestcount.
```

Because the timestamps control currency of queries in either the long or short version of query "D" and the end of chain query above, it is a requirement that the timestamps used to mark the records be the current_timestamp (or equivalent) from the database rather than a timestamp provided by an application server. This requirement was presented as desirable because it prevented discrepancies between updates from different servers, but it is now a requirement since even small drifts in the clocks between application and database servers leads to inconsistent results in the current_timestamp queries. It is also a new requirement that all parts of a history chain be updated with the same timestamp and in the same unit of work.

Testing today points out the requirement that the fields CreateTS and EndTS must be timestamps. If they are date type fields, then incorrect chains will be developed and resolving "prior" becomes impossible. A time stamp typically is accurate to the millisecond. Whereas a Date/Time typically is less precise, such as to the day for example. The ability to find the "prior" record and "next" are an unmentioned feature of the model, but that feature depends on distinct time stamps.

Figure 6A:
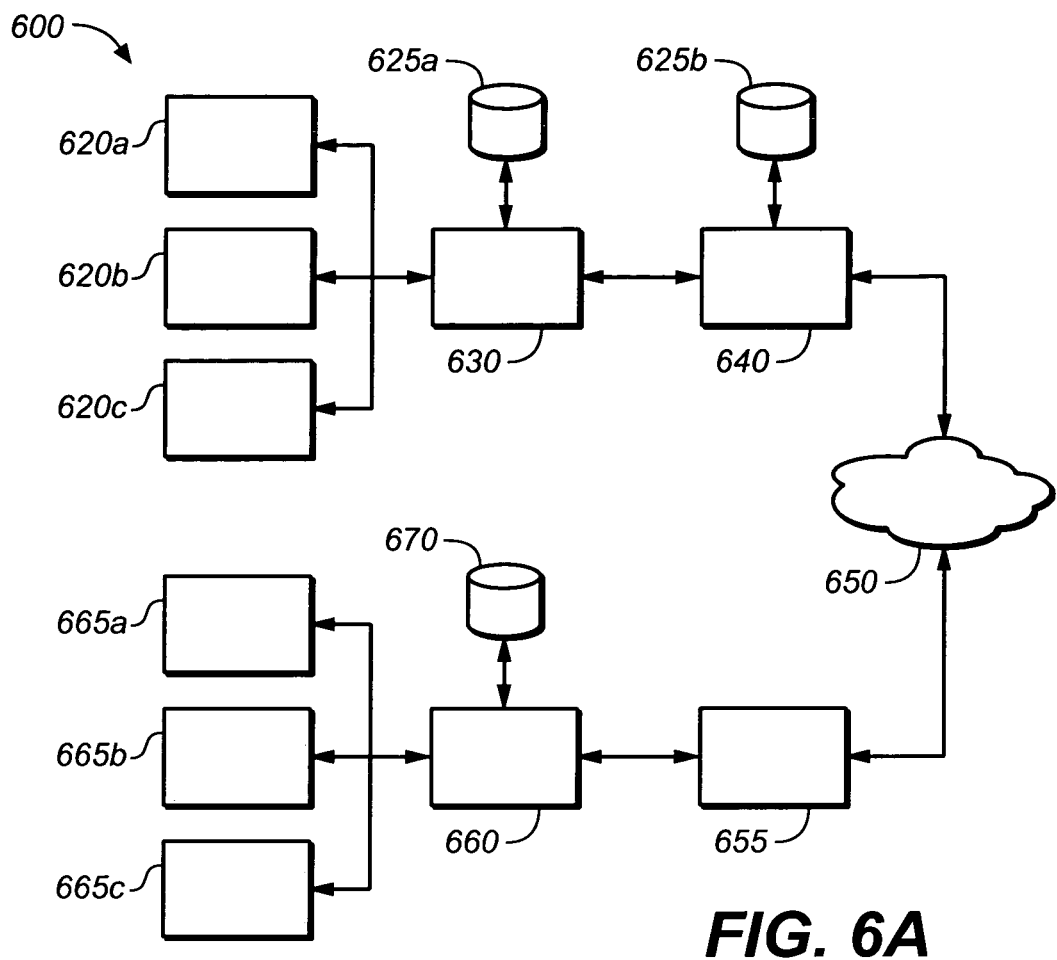
FIG. 6A illustrates an exemplary computing system that may be employed to implement some or all processing functionally in certain embodiments of the invention.

Now turning to FIG. 6A, there is a system 600 in which all of the above methods, or selections thereof, may be implemented. System 600 comprises a plurality of computers 620a-c that may include user nodes, such as workstations, personal computers, or terminals connecting with a larger more centralized computer for processing capacity. Computers 620a-c may also include servers, such as racks of servers in a dataroom. An example computer 620a is described with respect to FIG. 6B. Computers 620a-c may connect to a Local Area Network (LAN), by for example, connecting with a switch 630. The LAN may be implemented with copper connections, fiber, or wirelessly, and may operate at any of a variety of speeds, for example the LAN may be a copper gigabit Ethernet network. Computers 620a-c may have multiple network connections.

Switch 630 may also connect with a Network Attached Storage (NAS) 625a that may store information including design specifications, cell libraries, simulator code, and the like. NAS 625a may be accessible by computers 620a-c. Switch 630 in turn communicates with a router 640 that may connect over a private network or dedicated link to storage medium 625b. Router 640 connects over a Wide Area Network, including using the Internet, and various types of private networks, or leased lines, to a router 655 for a second local area network that includes switch 660 which connects with a NAS 670. Switch 660 networks computers 665a-c which may also include user interface points as well as servers able to accept jobs for processing.

Figure 6B:
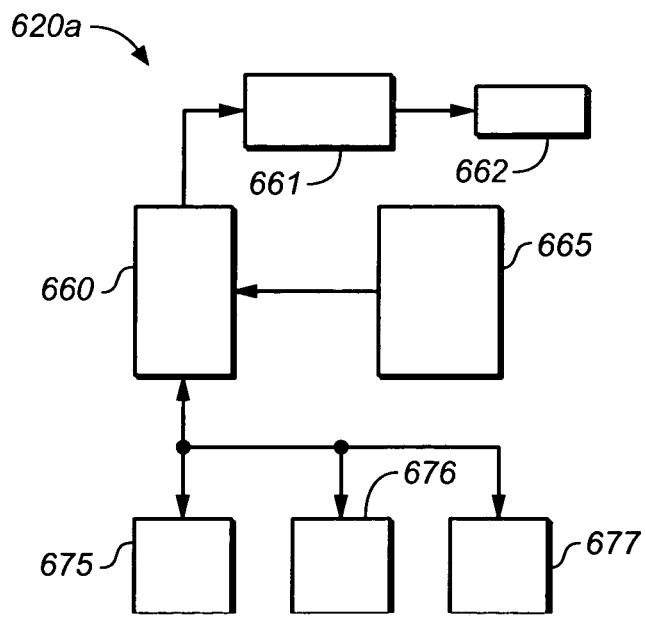
FIG. 6B illustrates an exemplary computing system that may be employed to implement some or all processing functionality in certain embodiments of the invention.

FIG. 6B illustrates an example computer 620a that includes a central processing unit (CPU) 660 communicating with storage 675, network port 676, and I/O 677. User interface 665 may comprise keyboards, mice, voice recognition and other interfaces. The CPU outputs data for display through display controller 661 to display 662.

It will be understood that the foregoing description and drawings of preferred embodiment in accordance with the present invention are merely illustrative of the principles of this invention, and that various modifications can be made by those skilled in the art without departing from the scope and spirit of the invention.

The invention claimed is:

1. A computer-implemented method to produce a history recording changing events in a database comprising:

accessing with a computer processor a data store that includes a first record indicating first data associated with a first event, and the first record indicating a first effective time interval during which the first data is effective and the first record indicating a first time-of-creation time interval during which the first data is current with respect to the database, wherein the first effective time interval starts with a first effective-date and ends with a first end-date, and wherein the first time-of-creation interval starts with a first create-timestamp and ends with a first end-timestamp; and adjusting the data store upon an occurrence of a second event, comprising:

adding a second record indicating second data associated with the second event, and the second record indicating a second effective time interval during which the second data is effective and the second record indicating a second time-of-creation time interval during which the second data is current with respect to the database, wherein the second effective time interval starts with a second effective-date and ends with a second end-date, and wherein the second time-of-creation interval starts with a second create-timestamp and ends with a second end-timestamp, if the first effective time interval starts earlier than the second effective time interval, updating the first effective time interval of the first record to be immediately preceding the second effective time interval of the second record, else setting the second effective time interval to be immediately preceding the first effective time interval.

2. An article of manufacture comprised of computer code stored on a computer readable memory to cause a computer system to perform a process to update a data store that includes a first record indicating first data associated with a first event, and the first record indicating a first effective time interval during which the first data is effective and the first record indicating a first time-of-creation time interval during which the first data is current with respect to a database, wherein the first effective time interval starts with a first effective-date and ends with a first end-date, and wherein the first time-of-creation interval starts with a first create-timestamp and ends with a first end-timestamp, the process comprising:

adjusting with a computer processor the data store upon an occurrence of a second event, comprising:

adding a second record indicating second data associated with the second event, and the second record indicating a second effective time interval during which the second data is effective and the second record indicating a second time-of-creation time interval during which the second data is current with respect to the database, wherein the second effective time interval starts with a second effective-date and ends with a second end-date, and wherein the second time-of-creation interval starts with a second create-timestamp and ends with a second end-timestamp,
if the first effective time interval starts earlier than the second effective time interval, updating the first effective time interval of the first record to be immediately preceding the second effective time interval of the second record, else setting the second effective time interval to be immediately preceding the first effective time interval.

3. A computer-implemented method to produce a history recording changing events in a database comprising:
accessing with a computer processor a data store that includes a first record indicating first data associated with a first event, and the first record indicating a first effective time interval and the first record indicating a first time-of-creation time interval, wherein the first effective time interval starts with a first effective-date and ends with a first end-date, and wherein the first time-of-creation interval starts with a first create-timestamp and ends with a first end-timestamp; and
adjusting the data store upon an occurrence of a second event, comprising:
adding a second record indicating second data associated with the second event, and the second record indicating a second effective time interval and the second record indicating a second time-of-creation time interval, wherein the second effective time interval starts with a second effective-date and ends with a second end-date, and wherein the second time-of-creation interval starts with a second create-timestamp and ends with a second end-timestamp,
if the first effective time interval starts earlier than the second effective time interval, updating the first time-of-creation interval of the first record and adding a third record indicating the first data associated with the first event, and the third record indicating a third effective time interval that is immediately preceding the second effective time interval of the second record and the third record indicating a third time-of-creation time interval, wherein the third effective time interval starts with a third effective-date and ends with a third end-date, and wherein the third time-of-creation interval starts with a third create-timestamp and ends with a third end-timestamp, else setting the second effective time interval of the second record to be immediately preceding the first effective time interval of the first record.

4. A computer-implemented method to update a data store that includes a first record indicating first data associated with a first event, and the first record indicating a first effective time interval and the first record indicating a first time-of-creation time interval, wherein the first effective time interval starts with a first effective-date and ends with a first end-date, and wherein the first time-of-creation interval starts with a first create-timestamp and ends with a first end-timestamp, the method comprising:
adjusting with a computer processor the data store upon an occurrence of a second event, comprising:
adding a second record indicating second data associated with a second event, and the second record indicating a second effective time interval and the second record indicating a second time-of-creation time interval, wherein the second effective time interval starts with a second effective-date and ends with a second end-date, and wherein the second time-of-creation interval starts with a second create-timestamp and ends with a second end-timestamp,
if the first effective time interval starts earlier than the second effective time interval, updating the first time-of-creation interval of the first record and adding a third record indicating the first data associated with the first event, and the third record indicating a third effective time interval that is immediately preceding the second effective time interval of the second record and the third record indicating a third time-of-creation time interval, wherein the third effective time interval starts with a third effective-date and ends with a third end-date, and wherein the third time-of-creation interval starts with a third create-timestamp and ends with a third end-timestamp, else setting the second effective time interval to be immediately preceding the first effective time interval.

5. The method of claim 1, wherein the first and second effective-dates record real world date-times of the first and second events giving rise to the first and second records.

6. The method of claim 1, wherein the first and second end-dates have initialized dates that are in the indefinite future.

7. The method of claim 1, wherein updating the first effective time interval to be immediately preceding the second effective time interval comprises:
updating the first end-date to be an instant prior to the second effective-date.

8. The method of claim 1, wherein setting the second effective time interval to be immediately preceding the first effective time interval comprises:
setting the second end-date to be an instant prior to the first effective-date.

9. The method of claim 1, wherein the first and second create-timestamps record when the first and second records are first created.

10. The method of claim 1, wherein the first and second end-timestamps have initialized dates that are in the indefinite future.

11. The method of claim 1, further comprising:
if the first effective time interval starts earlier than the second effective time interval and if the data store further includes a third record indicating a third event associated with third data that describes the subject matter, and indicating a third effective time interval during which the third data is effective with respect to the subject matter and indicating a third time-of-creation time interval during which the third data is current with respect to the database, wherein the third effective time interval starts later than the second effective time interval, setting the second effective time interval to be immediately preceding the third effective time interval.

12. The method of claim 11, wherein the first effective time interval starts with a first effective-date and ends with a first end-date, and wherein the second effective time interval starts with a second effective-date and ends with a second end-date, and wherein the third effective time interval starts with a third effective-date and ends with a third end-date.

13. The method of claim 12, wherein the first, second, and third effective-dates record real world date-times of the first, second, and third events giving rise to the first, second, and third records.

14. The method of claim 12, wherein the first, second, and third end-dates have initialized dates that are in the indefinite future.

15. The method of claim 12, wherein updating the first effective time interval to be immediately preceding the second effective time interval comprises:
updating the first end-date to be an instant prior to the second effective-date.

16. The method of claim 12, wherein setting the second effective time interval to be immediately preceding the first effective time interval comprises:
   setting the second end-date to be an instant prior to the first effective-date.

17. The method of claim 12, wherein setting the second effective time interval to be immediately preceding the third effective time interval comprises:
   setting the second end-date to be an instant prior to the third effective-date.

18. The method of claim 11, wherein the first time-of-creation interval starts with a first create-timestamp and ends with a first end-timestamp, and wherein the second time-of-creation interval starts with a second create-timestamp and ends with a second end-timestamp, and wherein the third time-of-creation interval starts with a third create-timestamp and ends with a third end-timestamp.

19. The method of claim 18, wherein the first, second, and third create-timestamps record when the first, second, and third records are first created.

20. The method of claim 18, wherein the first, second, and third end-timestamps have initialized dates that are in the indefinite future.

21. The article of manufacture of claim 2, wherein the first and second effective-dates record real world date-times of the first and second events giving rise to the first and second records.

22. The article of manufacture of claim 2, wherein the first and second end-dates have initialized dates that are in the indefinite future.

23. The article of manufacture of claim 2, wherein updating the first effective time interval to be immediately preceding the second effective time interval comprises:
   updating the first end-date to be an instant prior to the second effective-date.

24. The article of manufacture of claim 2, wherein setting the second effective time interval to be immediately preceding the first effective time interval comprises:
   setting the second end-date to be an instant prior to the first effective-date.

25. The article of manufacture of claim 2, wherein the first and second create-timestamps record when the first and second records are first created.

26. The article of manufacture of claim 2, wherein the first and second end-timestamps have initialized dates that are in the indefinite future.

27. The article of manufacture of claim 2, further comprising:
   if the first effective time interval starts earlier than the second effective time interval and if the data store further includes a third record indicating a third event associated with third data that describes the subject matter, and indicating a third effective time interval during which the third data is effective with respect to the subject matter and indicating a third time-of-creation time interval during which the third data is current with respect to the database, wherein the third effective time interval starts later than the second effective time interval, setting the second effective time interval to be immediately preceding the third effective time interval.

28. The article of manufacture of claim 27, wherein the first effective time interval starts with a first effective-date and ends with a first end-date, and wherein the second effective time interval starts with a second effective-date and ends with a second end-date, and wherein the third effective time interval starts with a third effective-date and ends with a third end-date.

29. The article of manufacture of claim 28, wherein the first, second, and third effective-dates record real world date-times of the first, second, and third events giving rise to the first, second, and third records.

30. The article of manufacture of claim 28, wherein the first, second, and third end-dates have initialized dates that are in the indefinite future.

31. The article of manufacture of claim 28, wherein updating the first effective time interval to be immediately preceding the second effective time interval comprises:
   updating the first end-date to be an instant prior to the second effective-date.

32. The article of manufacture of claim 28, wherein setting the second effective time interval to be immediately preceding the first effective time interval comprises:
   setting the second end-date to be an instant prior to the first effective-date.

33. The article of manufacture of claim 28, wherein setting the second effective time interval to be immediately preceding the third effective time interval comprises:
   setting the second end-date to be an instant prior to the third effective-date.

34. The article of manufacture of claim 27, wherein the first time-of-creation interval starts with a first create-timestamp and ends with a first end-timestamp, and wherein the second time-of-creation interval starts with a second create-timestamp and ends with a second end-timestamp, and wherein the third time-of-creation interval starts with a third create-timestamp and ends with a third end-timestamp.

35. The article of manufacture of claim 34, wherein the first, second, and third create-timestamps record when the first, second, and third records are first created.

36. The article of manufacture of claim 34, wherein the first, second, and third end-timestamps have initialized dates that are in the indefinite future.

37. The method of claim 3, wherein the first, second, and third effective-dates record real world date-times of the first, second, and third events giving rise to the first, second, and third record.

38. The method of claim 3, wherein the first, second, and third end-dates have initialized dates that are in the indefinite future.

39. The method of claim 3, wherein indicating the third effective time interval that is immediately preceding the second effective time interval comprises:
   indicating the third end-date to be an instant prior to the second effective-date.

40. The method of claim 3, wherein setting the second effective time interval to be immediately preceding the first effective time interval comprises:
   setting the second end-date to be an instant prior to the first effective-date.

41. The method of claim 3, wherein the first, second, and third create-timestamps record when the first, second, and third records are first created.

42. The method of claim 3, wherein the first, second, and third end-timestamps have initialized dates that are in the indefinite future.

43. The method of claim 3, wherein updating the first time-of-creation interval comprises updating the first create-timestamp to record when the second record is first created.

44. The method of claim 3, further comprising:
   if the first effective time interval starts earlier than the second effective time interval and if the data store further includes a fourth record indicating a fourth event associated with fourth data that describes the subject matter, and indicating a fourth effective time interval and indicating a fourth time-of-creation time interval, wherein the fourth effective time interval starts later than the second effective time interval, setting the second effective time interval to be immediately preceding the fourth effective time interval.

45. The method of claim 44, wherein the first effective time interval starts with a first effective-date and ends with a first end-date, and wherein the second effective time interval starts with a second effective-date and ends with a second end-date, and wherein the third effective time interval starts with a third effective-date and ends with a third end-date, and wherein the fourth effective time interval starts with a fourth effective-date and ends with a fourth end-date.

46. The method of claim 45, wherein the first, second, third, and fourth effective-dates record real world date-times of the first, second, third, and fourth events giving rise to the first, second, third, and fourth record.

47. The method of claim 45, wherein the first, second, third, and fourth end-dates have initialized dates that are in the indefinite future.

48. The method of claim 45, wherein indicating the third effective time interval that is immediately preceding the second effective time interval comprises:
    indicating the third end-date to be an instant prior to the second effective-date.

49. The method of claim 45, wherein setting the second effective time interval to be immediately preceding the first effective time interval comprises:
    setting the second end-date to be an instant prior to the first effective-date.

50. The method of claim 45, wherein setting the second effective time interval to be immediately preceding the fourth effective time interval comprises setting the second end-date to be an instant prior to the fourth effective-date.

51. The method of claim 44, wherein the first time-of-creation interval starts with a first create-timestamp and ends with a first end-timestamp, and wherein the second time-of-creation interval starts with a second create-timestamp and ends with a second end-timestamp, and wherein the third time-of-creation interval starts with a third create-timestamp and ends with a third end-timestamp, and wherein the fourth time-of-creation interval starts with a fourth create-timestamp and ends with a fourth end-timestamp.

52. The method of claim 51, wherein the first, second, third, and fourth create-timestamps record when the first, second, third, and fourth records are first created.

53. The method of claim 51, wherein the first, second, third, and fourth end-timestamps have initialized dates that are in the indefinite future.

54. The method of claim 51, wherein updating the first time-of-creation interval comprises updating the first create-timestamp to record when the second record is first created.

55. The method of claim 4, wherein the first, second, and third effective-dates record real world date-times of the first, second, and third events giving rise to the first, second, and third record.

56. The method of claim 4, wherein the first, second, and third end-dates have initialized dates that are in the indefinite future.

57. The method of claim 4, wherein indicating the third effective time interval that is immediately preceding the second effective time interval comprises:
    indicating the third end-date to be an instant prior to the second effective-date.

58. The method of claim 4, wherein setting the second effective time interval to be immediately preceding the first effective time interval comprises:
    setting the second end-date to be an instant prior to the first effective-date.

59. The method of claim 4, wherein the first, second, and third create-timestamps record when the first, second, and third records are first created.

60. The method of claim 4, wherein the first, second, and third end-timestamps have initialized dates that are in the indefinite future.

61. The method of claim 4, wherein updating the first time-of-creation interval comprises updating the first create-timestamp to record when the second record is first created.

62. The method of claim 4, further comprising:
    if the first effective time interval starts earlier than the second effective time interval and if the data store further includes a fourth record indicating a fourth event associated with fourth data that describes the subject matter, and indicating a fourth effective time interval and indicating a fourth time-of-creation time interval, wherein the fourth effective time interval starts later than the second effective time interval, setting the second effective time interval to be immediately preceding the fourth effective time interval.

63. The method of claim 62, wherein the first effective time interval starts with a first effective-date and ends with a first end-date, and wherein the second effective time interval starts with a second effective-date and ends with a second end-date, and wherein the third effective time interval starts with a third effective-date and ends with a third end-date, and wherein the fourth effective time interval starts with a fourth effective-date and ends with a fourth end-date.

64. The method of claim 63, wherein the first, second, third, and fourth effective-dates record real world date-times of the first, second, third, and fourth events giving rise to the first, second, third, and fourth record.

65. The method of claim 63, wherein the first, second, third, and fourth end-dates have initialized dates that are in the indefinite future.

66. The method of claim 63, wherein indicating the third effective time interval that is immediately preceding the second effective time interval comprises:
    indicating the third end-date to be an instant prior to the second effective-date.

67. The method of claim 63, wherein setting the second effective time interval to be immediately preceding the first effective time interval comprises:
    setting the second end-date to be an instant prior to the first effective-date.

68. The method of claim 63, wherein setting the second effective time interval to be immediately preceding the fourth effective time interval comprises setting the second end-date to be an instant prior to the fourth effective-date.

69. The method of claim 62, wherein the first time-of-creation interval starts with a first create-timestamp and ends with a first end-timestamp, and wherein the second time-of-creation interval starts with a second create-timestamp and ends with a second end-timestamp, and wherein the third time-of-creation interval starts with a third create-timestamp and ends with a third end-timestamp, and wherein the fourth time-of-creation interval starts with a fourth create-timestamp and ends with a fourth end-timestamp.

70. The method of claim 69, wherein the first, second, third, and fourth create-timestamps record when the first, second, third, and fourth records are first created.

71. The method of claim 69, wherein the first, second, third, and fourth end-timestamps have initialized dates that are in the indefinite future.

72. The method of claim 69, wherein updating the first time-of-creation interval comprises updating the first create-timestamp to record when the second record is first created.

* * * * *